United States Patent
Fahlbusch et al.

(10) Patent No.: US 9,297,993 B2
(45) Date of Patent: Mar. 29, 2016

(54) RING ILLUMINATION DEVICE FOR A MICROSCOPE OBJECTIVE, AND MICROSCOPE OBJECTIVE

(71) Applicant: Carl Zeiss Microscopy GmbH, Jena (DE)

(72) Inventors: Ingo Fahlbusch, Gottingen (DE); Jan Buchheister, Jena (DE); Georg Herbst, Gottingen (DE); Max Funck, Weimar (DE); Uwe Wolf, Magdala (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/255,694

(22) Filed: Apr. 17, 2014

(65) Prior Publication Data

US 2014/0340742 A1 Nov. 20, 2014

(30) Foreign Application Priority Data

Apr. 19, 2013 (DE) .......................... 10 2013 006 995

(51) Int. Cl.
*G02B 21/10* (2006.01)
*G02B 21/08* (2006.01)

(52) U.S. Cl.
CPC .............. *G02B 21/10* (2013.01); *G02B 21/084* (2013.01)

(58) Field of Classification Search
CPC ......... G02B 21/06–21/125; G01N 2021/4759; A61B 1/0607; F21V 29/002–29/004; F21V 29/503; F21V 29/507; F21V 29/70; F21V 29/83; F21V 33/0088; F21Y 2105/00–2105/003; H01L 33/64–33/644
USPC ................................. 359/385–390, 798–803; 362/249.02–249.06, 294, 373
See application file for complete search history.

(56) References Cited

U.S. PATENT DOCUMENTS

| | | | |
|---|---|---|---|
| 4,186,993 A | 2/1980 | Shimizu et al. | |
| 4,626,079 A | 12/1986 | Nakamura et al. | |
| 5,038,258 A * | 8/1991 | Koch | G01B 11/00 359/656 |
| 5,713,661 A * | 2/1998 | White | G01N 21/8806 359/629 |
| 6,857,762 B2 | 2/2005 | Shimokawa et al. | |
| 7,586,677 B2 | 9/2009 | Bertschi et al. | |
| 2004/0179278 A1* | 9/2004 | Bonaventura | G02B 7/008 359/820 |
| 2004/0263960 A1 | 12/2004 | Obuchi | |
| 2011/0085234 A1* | 4/2011 | Feger | 359/363 |

FOREIGN PATENT DOCUMENTS

| CN | 1014141056 B | 8/2010 |
|---|---|---|
| DE | 10030772 | 10/2001 |
| DE | 20 2005 004 635 | 7/2005 |

(Continued)

OTHER PUBLICATIONS

Search Report, German Patent and Trademark Office, German Patent Application No. 10 2013 006 995.5, dated Feb. 27, 2014.

*Primary Examiner* — Stephone B Allen
*Assistant Examiner* — James McGee
(74) *Attorney, Agent, or Firm* — Nixon Peabody LLP; Jeffrey L. Costellia

(57) ABSTRACT

The invention relates to a ring illumination device (07) for a microscope objective (01), and a microscope objective (01) provided with such a ring illumination device (07). The ring illumination device (07) has at least two LED units (11) which are accommodated in an illumination ring (17) which can be connected to the microscope objective (01). According to the invention, the ring illumination device (07) has at least one lower entrance opening (08) and at least one upper outlet opening (09) for cooling air, for cooling the LED units (11).

10 Claims, 3 Drawing Sheets

(56) References Cited

FOREIGN PATENT DOCUMENTS

| DE | 603 03 328 | 7/2006 |
| DE | 10 2005 036 230 | 11/2006 |
| DE | 20 2006 013 464 | 11/2006 |
| EP | 1072884 A2 | 1/2001 |
| EP | 2 128 679 A2 | 12/2009 |
| WO | WO 97/16024 A1 | 5/1997 |

* cited by examiner

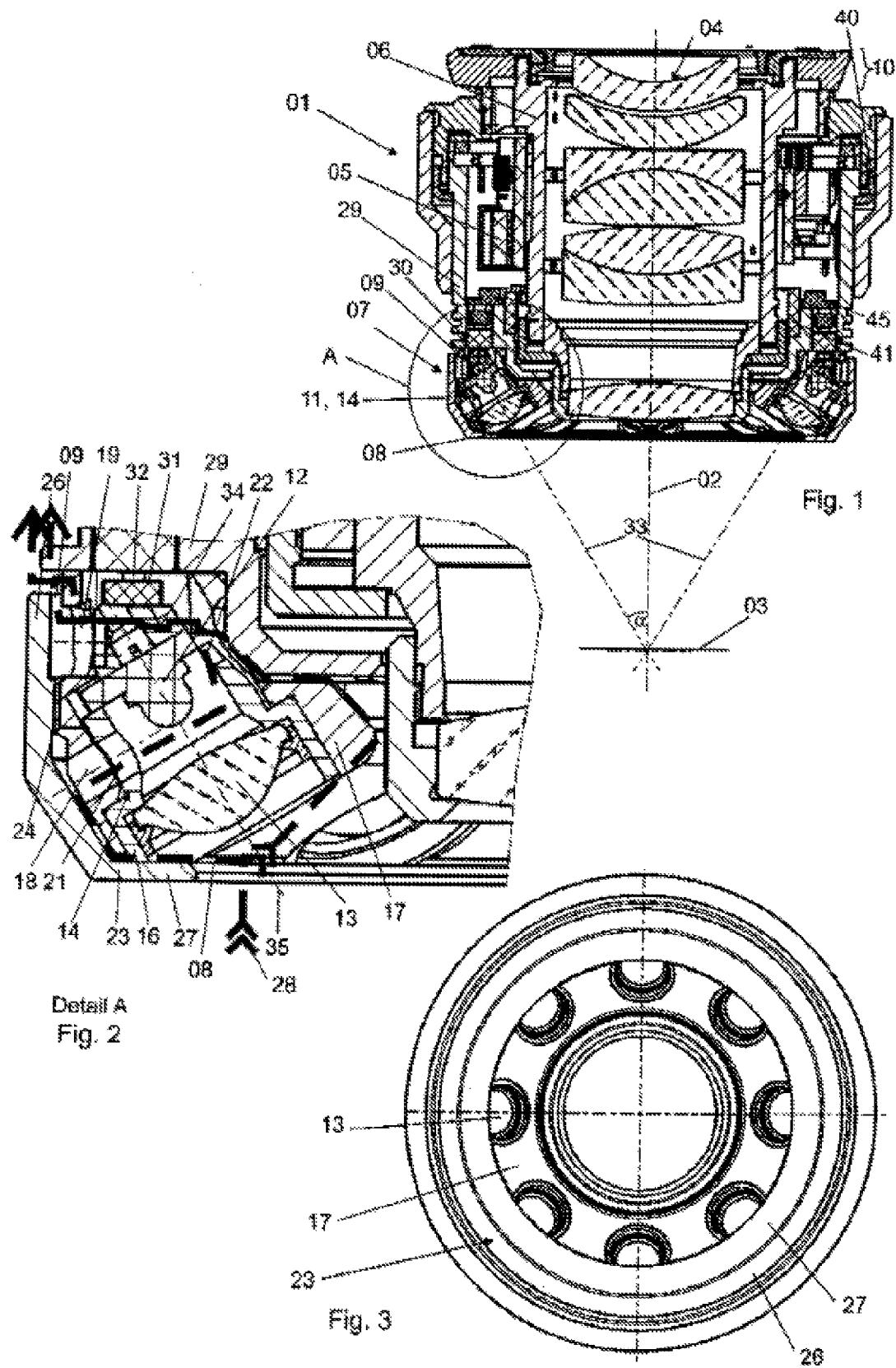

Cross section A-A

Cross section B-B

RING ILLUMINATION DEVICE FOR A MICROSCOPE OBJECTIVE, AND MICROSCOPE OBJECTIVE

BACKGROUND

The invention relates to a ring illumination device for an objective, particularly for a microscope objective, and a microscope objective with such a ring illumination device.

Various illuminating devices and illuminating technologies for microscopes are known, from the prior art. Ring illumination devices are used primarily for dark field reflected light illumination. Known systems are disposed outside the image-forming optics of the objective. The light is deflected onto the sample generally by a ring-shaped mirror or ring-shaped lenses. The designs tend to be costly and to occupy a large space outside the objective, which can have the effect of, e.g., substantially inhibiting the radius of swing of the objective.

In U.S. Pat. No. 4,186,993 A, for example, an objective is described wherein a ring-shaped transparent diffuser and a ring-shaped condenser lens are disposed around the image-forming optics, in the light-spreading direction.

In U.S. Pat. No. 4,626,079 A a number of variants of a dark field illumination system are shown, wherein a combination of ring-shaped lenses and/or ring-shaped mirrors are employed around the objective lens.

DE 603030328 T2 shows a ring-shaped illumination device for microscopes wherein LEDs are used as light sources. Two or three types of LEDs with different emission colors, preferably red, green, and blue, are used, which are disposed in the same play around the optical axis and are oriented essentially perpendicularly to the optical axis. The color components are mixed using dichroic mirror groups, and are deflected onto the object plane by means of a reflector.

In DE 20-2005-004635 U1 discloses an illumination ring for a reflected light microscope having at least movably mounted LEDs which have their adjustment angle relative to the optical axis adjustable for the purpose of focusing of the illumination. Because of thermal sensitivity, the LEDs are operated at at most one half of the admissible current, and the necessary light intensity is achieved by focusing or by using a larger number of LEDs. The contacting and electricity supply to the LEDs are relatively costly.

CN 101414056 B discloses an objective with a dark field illumination device. The image-forming optics of the objective are disposed in an inner cylinder, with an LED illumination device being disposed in an outer cylinder. Between the LEDs and the object, a ring-shaped optical element is provided which transforms the LED light into parallel light. The illumination device can be coupled to a light field objective also, with a corresponding adapter.

The brightness of an LED increases with the power consumption. At a constant temperature of the semiconductor, the increases is nearly proportional. The efficiency decreases with increasing temperature, however, and therefore the yield of light output at the power limit is reduced, depending on the type of cooling. Thus effective cooling is essential for the efficiency of the illumination.

Accordingly, the underlying problem of the invention was to devise a ring illumination device for reflected light illumination for a microscope objective, and a microscope objective for such an illumination device, which allows dark field illumination with a high light yield and efficiency, and which is easy to set up and requires minimal maintenance.

SUMMARY

This problem is solved with a ring illumination device according to claim 1, and a microscope objective with such an illumination device, according to claim 10.

Advantageous embodiments are set forth in the dependent claims.

An inventive ring illumination device has at least two light-emitting diode units, disposed in an illumination ring. The LED units comprise at least one LED and one set of "collector optics", and preferably they are uniformly distributed over the periphery of the illumination ring. The LED units are positioned in the illumination ring such that a rectangular camera chip can efficiently and without particularly problematic bright spots register the image-forming beams reflected from the object plane.

According to the invention, the ring illumination device has a lower entrance opening and an upper outlet opening, for cooling air. By means of this design, the illumination device is self-cooling. The self-cooling effect is produced by a "chimney effect" in the illumination ring, and is strengthened with increasing heating of the component parts. The cooling of the component parts occurs in that rising cool air passes by all components parts that are subject to being heated, wherewith such air is heated and is followed by cool air drawn in through the entrance opening. Advantageously, a second entrance opening and a second outlet opening for the cooling air are also provided in the illumination ring.

It may be appreciated that the advantages of the invention are that the LEDs can be operated with high power consumption, conferring good brightness and efficiency of the lighting.

Advantageously, the components of the illumination device are fabricated from materials with good heat conduction.

An inventive microscope objective is comprised of image-forming optics, disposed in an inner frame tube. In known fashion, objective functionalities, such as e.g. electrical control units, interior focusing means, collision protection means, temperature control means, and motorization means, etc., are accommodated in an outer "objective shell" which surrounds the frame tube at least in segments. On the end face of the objective bearing a front lens, the illumination device is coupled electrically and mechanically with the "objective shell". In this connection, the illumination ring has an electronic interface, preferably in the form of a contact surface, for each LED unit.

Via this electronic interface, the illumination device can be controlled and, preferably, also adjusted. It is particularly advantageous if the LED units are adjustable with respect to each other by means of a software tool and a calibration standard, in order to ensure that the object field will be constantly uniformly illuminated, e.g. with the use of LEDs which can be individually rapidly adjusted.

At high working distances between the objective and the object plane there is the risk that light from the LEDs will be reflected from the object directly into the object, giving rise to undesirable disturbances of the image. This situation can be relieved by deflecting the illuminating beam path outward and then onto the object plane. Toward this end, the microscope objective, according to another embodiment, may have a correction attachment which reflects the light of the LEDs outward and then onto a ring-shaped mirror, resulting in a shallower incident angle of the illumination. The correction attachment is centered with the objective, and advantageously can be coupled to the objective and to the illumination device by magnetic means.

The LED unit is comprised of, preferably, an LED disposed on a circuit board, and collector optics for forming an image of the light source in the object plane, and further a contact surface as an electronic interface. In this way, a so-called "critical illumination" is dimensioned, for which the optics can be realized in a relatively simple manner.

In a preferred embodiment, the LED units are disposed in "collectors" which can be pre-adjusted in a particularly easy manner. In order to provide effective cooling, it is advantageous if each of the "collectors" has a third entrance opening and a third outlet opening, for cooling air.

The illumination ring accommodates the "collectors" which have been completely pre-adjusted and which preferably are disposed in a corresponding circle comprised of openings, wherewith the entrance openings and the outlet openings are disposed such that the cooling air stream passes through the illumination ring upward from below. In this connection, the entrance openings and outlet openings of the "collectors", and of the illumination ring, are preferably superposed.

In a particularly preferred embodiment, eight collectors are accommodated in an illumination ring, namely distributed around the periphery of the illumination ring.

The "collector" comprises a collector housing which accommodates the collector optics, an LED circuit board, a cooling body, and a contact plate (or contact circuit board) with a contact surface (or surfaces) to provide and electronic interfaces, wherewith the LED circuit board and the contact plate are connected by wires which serves as conductors.

In an alternative embodiment, the LED unit is accommodated directly in the illumination ring, without the use of separate "collectors". Here each of the LEDs with its circuit board is preferably screwed into the illumination ring, and is also adjusted in the illumination ring, for the center of the object; the collector optics are also directly held in the illumination ring. With this configuration, it is not easy to replace a defective LED; rather, adjustments must be continually made.

The illumination ring is centered in an optical axis, with the objective.

BRIEF DESCRIPTION OF THE DRAWINGS

A preferred embodiment of the invention will be described in more detail, with reference to the drawings.

FIG. 1 illustrates a preferred embodiment of a microscope objective with a ring illumination device in a longitudinal cross sectional view;

FIG. 2 is a detail view from FIG. 1, showing the ring illumination device;

FIG. 3 is a view of the microscope objective illustrated in FIG. 1, from the direction of an objective plane;

DETAILED DESCRIPTION

Figure 4:
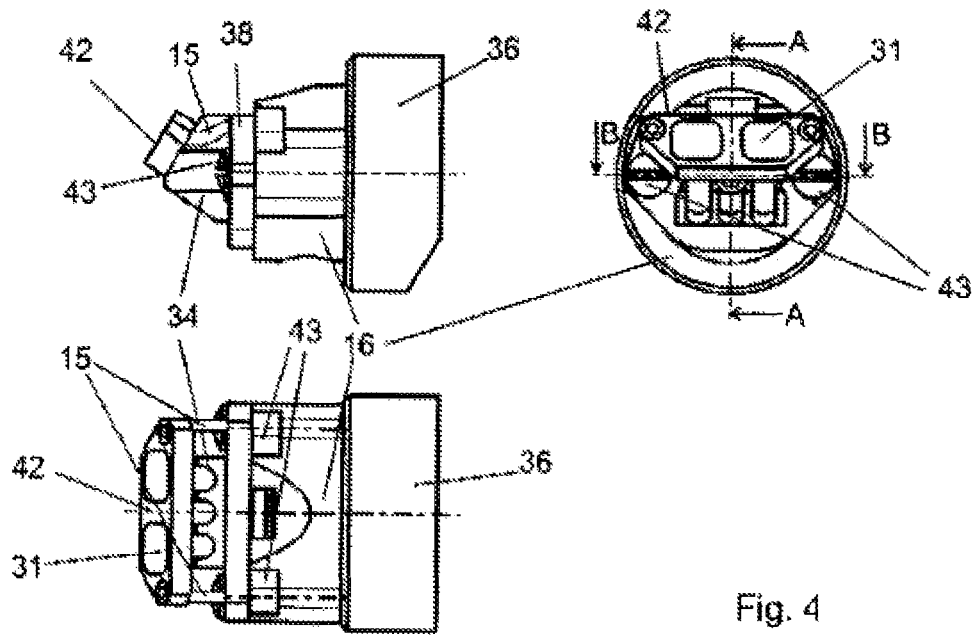
FIG. 4 shows various views of a "collector"

FIG. 1 illustrates a preferred embodiment of an inventive microscope objective 01 in a longitudinal cross sectional view along an optical axis 02. FIG. 2 shows a detail A from FIG. 1. FIG. 3 is a view of the microscope objective 01 shown in FIG. 1, from the direction of an object plane 03.

The microscope objective 01 is comprised of an image-forming optical assembly 04 disposed in an inner objective tube 06.

The illustrated preferred embodiment of the inventive microscope objective 01 will be described in more detail with reference to FIGS. 1-3.

A ring illumination device 07 is attached to the side of the microscope objective 01 which is directed toward the object plane 03.

The ring illumination device 07 has a lower entrance opening 08 and an upper outlet opening 09, for cooling air. In the given embodiment, the entrance opening 08 and outlet opening 09 are ring-shaped. The cooling air flows around the components which are heated in the course of the operation of the ring illumination device, generating a "chimney effect".

Each of the light-emitting diode units 11 comprises an LED assembly 12 and a collector lens 13, which in this embodiment are held jointly in a "collector" 14. The "collectors" 14 have a collector housing 16 and along with this housing are disposed in an illumination ring 17; when necessary (e.g. in the event of aging or defect) they are easily replaceable. The structure of a "collector" 14 will be described extensively hereinbelow with reference to FIGS. 4, 5, and 6.

In order to achieve the cooling "chimney effect" in this embodiment, each illumination ring 17 has a second entrance opening 18 and a second outlet opening 19, and the collector housing 16 has a third entrance opening 21 and a third outlet opening 22.

An adapter ring 23 is attached to the illumination ring 17, preferably by means of a thread 24. The thread 24 is disposed on an axial segment 26 of the adapter ring 23. The axial segment 26 covers the second outlet opening 19 on the outer diameter of the illumination ring 17, up to the gap in the upper outlet opening 09. This prevents an operator from coming into contact with the hotter part of the illumination ring 17.

A radial segment 27 of the adapter ring serves as an axial fixing means for securing the "collector" 14 in the illumination ring 17.

The arrow 28 indicates the cooling air stream from the lower entrance opening 08 to the upper outlet opening 09. Obviously, the air flows around the components which are illustrated here in cross section. One skilled in the art will appreciate that additional partial streams which accomplish cooling will arise.

Preferably, the illumination ring 17 is connected to an objective shell 29 by means of screw connections provided in the peripheral space between the "collectors" 14. The objective shell 29 preferably has other means for functionalities of the objective, including a control unit 10 for the microscope objective 01 and the ring illumination device 07, or at least connecting components for such a control unit. The objective shell 29 advantageously has cooling vanes 30. Additionally it may be advantageous if an insulation shell 41 is mounted or included in the objective shell 29, which prevents heat from being conducted through mechanical contact surfaces to the interior optical assembly 04. Additionally, the objective shell 29 may be disposed over an additional adapter ring 40 in the optical axis 02. In this way, fluctuations in height due to adjustment of the optical system can be compensated for, and the illumination can be kept in focus in the object plane 03.

Each of the "collectors" 14 is electrically connected by means of a contact surface 31 to a contact spring 32 mounted in the objective shell 29. An electronic interface is realized between the control unit of the objective 05 and the ring illumination device 07 by means of these contacts 31, 32. The contact springs 32 are soldered into an advantageously ring-shaped flat assembly (FA) 45. The flat assembly 45 is connected with the control unit of the objective 05. The integration of the control unit in the objective provides the advantage of requiring fewer electronic lines to the control unit in the microscope. The control unit of the objective 05 itself is now connected via electrical lines to an electronic main interface 10 of the microscope objective 01. The electronic main interface 10 of the microscope objective 01 then forms the transition point for the signals from the microscope objective 01 into the microscope and thereby into a control center.

The "collectors" 14 are disposed inclined in the illumination ring 17 such that the LED assemblies 12 produce an illumination beam path 33 in the object plane 03. The angle α results from the free working distance of the microscope objective 01 and the selected circle on which the openings of the "collectors" 14 are disposed in the illumination ring 17. By means of a cooling body 34 provided in the "collector" 14, a preferred tilting of the collector axis 35 is achieved. In this solution the tilting is selected such that the contact surfaces 31 are parallel to the object plane. This provides the additional advantage that the microscope objective 01 occupies a smaller space, and thus has a smaller external diameter.

Figure 5:
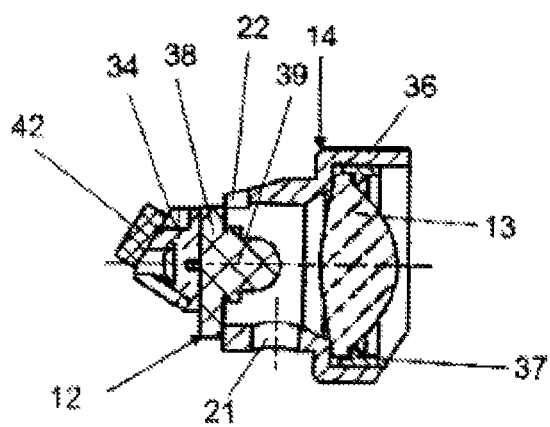
FIG. 5 is a longitudinal cross sectional view of the "collector" shown in FIG. 4, along the cross section line A-A of FIG. 4.
Figure 6:
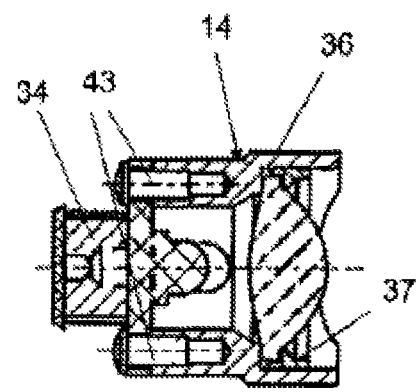
FIG. 6 is a longitudinal cross sectional view of the "collector" shown in FIG. 4, along the cross section line B-B of FIG. 4.

The "collector" 14 used in the preferred embodiment of the microscope objective 01 illustrated in FIGS. 1 to 3 is shown in detail in FIGS. 4 to 6.

In FIG. 4, various views of the "collector" 14 are shown. FIG. 5 shows a cross section along line A-A of FIG. 4, and FIG. 6 shows a cross section along line B-B of FIG. 4. Like reference numerals are used for the same elements, in accordance with the description provided above.

The collector housing 16 has a cylindrical segment 36 for accommodating the collector lens 13. The collector lens 13 is fixed in the collector housing 14 by means of a holding ring 37.

The LED assembly 12 comprises a circuit board 38 with an LED 39, here in the form of an SMD ceramic housing with a silicone resin and a lens, and further comprises the cooling body 34 and a contact plate 42 with the contact surface 31. The electrical connection between the contact plate 42 and the circuit board 38 is accomplished by soldered connecting wires 15. One skilled in the art can choose the correct LED on the basis of the required characteristics, and can dimension the cooling body based on the requirements.

The LED assembly 12 is attached to the end side of the collector housing 16 that is directed toward the collector lens 13, by means of screws 43, and is centered there at the same time. The adjustment of the "collector" 14 on the illumination axis 33 is accomplished by means of this screw connection. It is advantageous to realize the exact distance between the LED 39 and the collector lens 13 by means of mechanical tolerances in the collector housing 16. Alternatively, heat-conducting distancing rings may be used. Advantageously, the circuit board 38 and the screw connection are dimensioned so as to have good heat conduction, so that the heat of the LED 39 can be distributed outward above the cooling body 34 and over the circuit board 38 and the screw connection to the collector housing 16 and then to the illumination ring 17. Additionally it is advantageous to provide a heat-conducting adhesive between the LED assembly 12 and the contact plate 42. This provides improved heat transfer and at the same time an irreversible fixing to provide additional means of securing the adjustment.

The collector housing 16, the illumination ring 17, and the objective shell 29 are fabricated from material with good heat conduction, such as, e.g., cast aluminum.

Figure 7:
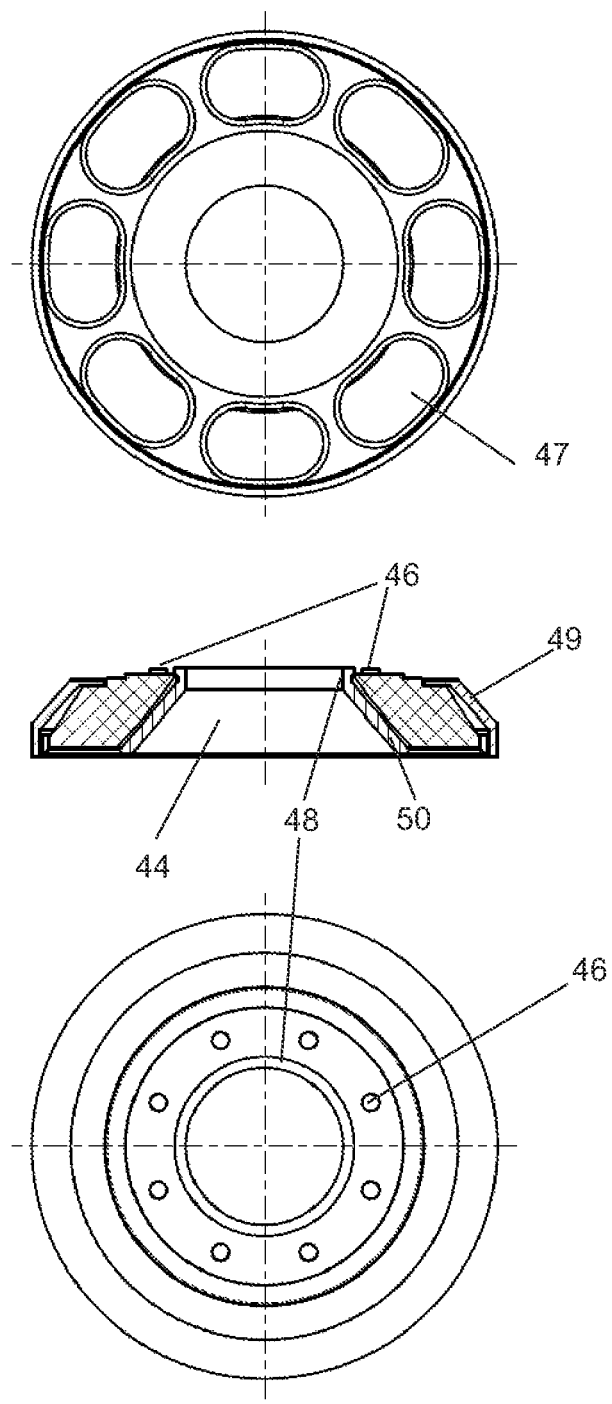
FIG. 7 is a cross sectional view of a corrective attachment.

FIG. 7 shows a correction attachment 44 which produces a more shallow illumination angle in the case of large working distances of the objective from the object plane. The correction attachment is advantageously distributed over the periphery and attached to the illumination ring, by means of permanent magnets 46. The permanent magnets 46 in the correction attachment 44 are disposed at an offset to the beam openings 47. Magnets are also provided in the illumination ring of the microscope objective 01, at corresponding positions. This provides for alignment of the beam openings 47 with the "collectors" 14. The correction attachment 46 is centered via a centering cylinder 48. Frame elements 49 and 50 serve advantageously here for protecting the reflecting surfaces.

The functioning of such a deflecting attachment is known to one skilled in the art, e.g. from DE 10320529 A1.

LIST OF REFERENCE NUMERALS

01 Microscope objective.
02 Optical axis.
03 Object plane.
04 Optical assembly.
05 Control unit.
06 Objective tube.
07 Ring illumination device.
08 Lower entrance opening.
09 Upper outlet opening.
10 Electronic main interface.
11 LED unit.
12 LED assembly.
13 Collector lens.
14 "Collector".
15 Conducting wires.
16 Collector housing.
17 Illumination ring.
18 Second entrance opening.
19 Second outlet opening.
20 - - -
21 Third entrance opening.
22 Third outlet opening.
23 Adapter ring.
24 Thread.
25 - - -
26 Axial segment.
27 Radial segment.
28 Cooling air stream.
29 Objective shell.
30 Cooling vanes.
31 Contact surface.
32 Contact spring.
33 Path of illuminating beam.
34 Cooling body.
35 Collector axis.
36 Cylindrical segment.
37 Holding ring.
38 Circuit board.
39 LED
40 Adapter ring.
41 Insulating ring.
42 Contact plate.
43 Screw.
44. Correction attachment.
45 Flat assembly.
46 Permanent magnets.
47 Beam opening.
48 Centering cylinder.
49 Frame element.
50 Frame element with beam openings.

The invention claimed is:

1. A ring illumination device for a microscope objective, comprising:
   at least two light emitting diode units accommodated in an illumination ring contained within the ring illumination device,
   wherein the ring illumination device is configured to encompass and to directly attach to the microscope objective, the ring illumination device including at least one lower entrance opening and at least one upper outlet opening of a passage within the ring illumination device for cooling air, to cool the at least two light emitting diode units by a chimney effect such that the passage is configured to draw cool air through the at least one lower entrance opening in the ring illumination device to exit through the at least upper outlet opening in the illumination device to generate a cooling air flow around the at least two light emitting diode units in the illumination ring contained within the ring illumination device.

2. A ring illumination device according to claim 1, wherein the at least two light emitting diode units comprise a cooling body.

3. A ring illumination device according to claim 1, wherein the at least two light emitting diode units comprise an electronic interface via which the ring illumination device is electrically coupled to the microscope objective.

4. A ring illumination device according to claim 1, wherein the illumination ring is fabricated from a heat-conducting material.

5. A ring illumination device according to claim 1, wherein the illumination ring has a second entrance opening and a second outlet opening.

6. A ring illumination device according to claim 5,
   wherein the light emitting diode units are each disposed in a collector housing held in the illumination ring, and
   wherein the collector housing has a third entrance opening and a third outlet opening.

7. A ring illumination device according to claim 6,
   wherein the collector housing is essentially cylindrically shaped,
   wherein at a body of the collector housing a collector lens is disposed, and
   wherein the third entrance opening is provided at a shell surface of the collector housing, and the third outlet opening is provided at a cover of the collector housing.

8. A ring illumination device according to claim 1, further comprising:
   a cover ring for holding the at least two light emitting diode units in the illumination ring,
   wherein cover ring surrounds the illumination ring at least in segment(s), and
   wherein cover ring comprises an axial edge and a radial edge.

9. A ring illumination device according to claim 8,
   wherein the axial edge projects in a direction of an extent of the objective, over a second outlet opening of the illumination ring,
   wherein a radial separation exists between the cover ring and the illumination ring in a region of the upper outlet opening which forms the upper outlet opening.

10. A microscope objective comprising the ring illumination device according to claim 1,
    wherein the ring illumination device is disposed on an objective shell and is electrically and mechanically coupled to said objective shell.

* * * * *